United States Patent
Sakai et al.

(10) Patent No.: US 11,450,922 B2
(45) Date of Patent: Sep. 20, 2022

(54) SEPARATOR, AND SEPARATOR FOR ALKALINE MANGANESE DRY BATTERY COMPRISING SAME

(71) Applicant: KURARAY CO., LTD., Okayama (JP)

(72) Inventors: Tomoki Sakai, Okayama (JP); Hiroyuki Kawai, Okayama (JP); Tomohiro Hayakawa, Okayama (JP); Toshimichi Kusunoki, Okayama (JP)

(73) Assignee: KURARAY CO., LTD., Okayama (JP)

(*) Notice: Subject to any disclaimer, the term of this patent is extended or adjusted under 35 U.S.C. 154(b) by 0 days.

(21) Appl. No.: 16/772,886

(22) PCT Filed: Dec. 25, 2018

(86) PCT No.: PCT/JP2018/047467
§ 371 (c)(1),
(2) Date: Jun. 15, 2020

(87) PCT Pub. No.: WO2019/131588
PCT Pub. Date: Jul. 4, 2019

(65) Prior Publication Data
US 2021/0111463 A1    Apr. 15, 2021

(30) Foreign Application Priority Data
Dec. 26, 2017 (JP) .............................. JP2017-249808

(51) Int. Cl.
*H01M 50/429* (2021.01)
*H01M 50/44* (2021.01)
(Continued)

(52) U.S. Cl.
CPC .......... *H01M 50/4295* (2021.01); *H01G 9/02* (2013.01); *H01G 11/52* (2013.01);
(Continued)

(58) Field of Classification Search
None
See application file for complete search history.

(56) References Cited

U.S. PATENT DOCUMENTS

2013/0149614 A1    6/2013  Kubo et al.
2013/0183569 A1*   7/2013  Hayakawa ............ H01M 50/44
                                                    429/144
(Continued)

FOREIGN PATENT DOCUMENTS

CN    102549805 A    7/2012
CN    103119752 A    5/2013
(Continued)

OTHER PUBLICATIONS

English translation of International Preliminary Report on Patentability and Written Opinion dated Jun. 30, 2020 in PCT/JP2018/047467, 6 pages.
(Continued)

*Primary Examiner* — Daniel S Gatewood
(74) *Attorney, Agent, or Firm* — Element IP, PLC

(57) ABSTRACT

To provide a separator which has a combination of a preferable air permeability enabling high prevention of internal short circuit and a high retention rate of such an air permeability in an electrolytic solution, and has more improved uniformity of the air permeability.
A separator comprising a porous sheet and cellulose nanofibers, wherein the porous sheet comprises a binder component having the SP value of 11 to 16 $(cal/cm^3)^{1/2}$, and the porous sheet has the cellulose nanofibers at the inside and on the surface thereof, and wherein the cellulose nanofibers are combined with the porous sheet by fusion of the binder component.

14 Claims, 5 Drawing Sheets

(51) Int. Cl.
  *H01M 50/449* (2021.01)
  *H01G 9/02* (2006.01)
  *H01G 11/52* (2013.01)
  *H01M 6/06* (2006.01)

(52) U.S. Cl.
  CPC ............ *H01M 6/06* (2013.01); *H01M 50/44* (2021.01); *H01M 50/449* (2021.01); *H01M 2300/0014* (2013.01)

(56) References Cited

U.S. PATENT DOCUMENTS

| | | | |
|---|---|---|---|
| 2015/0093625 A1 | 4/2015 | Hirano et al. | |
| 2015/0118540 A1* | 4/2015 | Fujiwara | H01M 10/05 429/144 |
| 2015/0294801 A1* | 10/2015 | Hayakawa | H01M 50/4295 361/502 |

FOREIGN PATENT DOCUMENTS

| | | |
|---|---|---|
| CN | 104518189 A | 4/2015 |
| CN | 104577009 A | 4/2015 |
| CN | 104885173 A | 9/2015 |
| CN | 106133216 A | 11/2016 |
| JP | H05-74439 A | 3/1993 |
| JP | 2001084986 A | 3/2001 |
| JP | 2001329432 A | 11/2001 |
| JP | 2008234898 A | 10/2008 |
| JP | 2009224100 A | 10/2009 |
| JP | 2012109268 A | 6/2012 |
| JP | 2014096335 A | 5/2014 |
| JP | 2015109290 A | 6/2015 |
| JP | 2015111546 A | 6/2015 |
| JP | 2016194186 A | 11/2016 |
| WO | WO-2012036025 A1 | 3/2012 |
| WO | WO-2014103992 A1 | 7/2014 |

OTHER PUBLICATIONS

International Search Report dated Apr. 2, 2019 in PCT/JP2018/047467, 1 page.
Extended European Search Report dated Oct. 29, 2021 in Patent Application No. 18897308.5, 8 pages.
Combined Chinese Office Action and Search Report dated May 17, 2022 in Patent Application No. 201880076105.1, 7 pages (with English translation of categories).

* cited by examiner

SEPARATOR, AND SEPARATOR FOR ALKALINE MANGANESE DRY BATTERY COMPRISING SAME

TECHNICAL FIELD

The present invention relates to a separator, and a separator for an alkaline manganese dry battery or a separator for a capacitor which consists of the separator.

BACKGROUND ART

Recently, demand for portable devices such as a portable audio, a portable video, and a cell-phone has been remarkably increased, and the size of the portable devices has been reduced. An alkaline manganese dry battery can be expected to have high reliability and can be reduced in size and weight, so it has been widely used in various portable devices.

Generally, in an alkaline manganese dry battery, a separator is used to separate a cathode active material from an anode active material. This separator requires various performances such as the following item (1) to (3):
(1) the separator should prevent internal short circuit of the cathode active material and the anode active material,
(2) the separator should have a high electrolytic solution absorption property in order to cause a sufficient electromotive reaction, and a good ion conductivity and low electrical resistance, and
(3) the separator should have small occupancy when incorporating in a battery, and thereby, amounts of the cathode active material, the anode active material and the like can be increased (a battery serviceable time can be increased).

In addition to the above performances, the heat resistance of the separator itself has been also required. For example, as a technology that can maintain a high discharge performance even under high temperature environment and after high temperature exposure, a separator for an alkaline battery is proposed, wherein the separator is formed by integral lamination of a sheet and a substrate, wherein the sheet consists of nanofibers comprising cellulose-based polymer and having a fiber diameter of 10 to 1000 nm, and wherein the substrate consists of a wet-laid nonwoven fabric composed of alkaline resistance fibers (Patent document 1). In the Examples of the document, the separator for an alkaline battery is produced by laminating the layer of cellulose nanofibers on the wet-laid nonwoven fabric substrate comprising the polyvinyl alcohol (PVA)-based main fibers and the PVA-based binder fibers by an electrostatic spinning method.

In addition, for example, as a technology to control a pore size by general thermal drying in order to obtain air permeability resistance providing preferable ion permeability or the like, a method for producing a separator for a battery is proposed, wherein the method comprises a dispersion liquid preparation step of dispersing cellulose nanofibers in a dispersion medium to prepare a nanofiber dispersion liquid, an adhesion step of adhering the dispersion liquid to a porous sheet, and a drying step of drying the porous sheet to which the dispersion liquid was adhered to remove the dispersion medium (Patent document 2).

PRIOR ART DOCUMENT

Patent Document

Patent Document 1: JP-A-2008-234898
Patent Document 2: JP-A-2014-96335

SUMMARY OF THE INVENTION

Problems to be Solved by the Invention

In the separator for an alkaline battery of Patent document 1, the substrate layer and the cellulose nanofiber layer are integrally laminated, but they are present as separate layers. In addition, in the electrostatic spinning method in the production method thereof, it is difficult to form the nanofiber layer highly uniformly. Therefore, it is difficult to control the air permeability thereof highly uniformly.

In the separator for a battery of Patent document 2, as described in Comparative examples below, the cellulose nanofibers easily drop out in an aqueous solvent, and denseness of the separator remarkably decreases. When such a separator is used in a battery, internal short circuit cannot be prevented, and deterioration of a battery performance and a battery life cannot be prevented.

Therefore, a problem of the present invention is to provide a separator which has a combination of a preferable air permeability enabling high prevention of internal short circuit and a high retention rate of such an air permeability in an electrolytic solution, and has more improved uniformity of the air permeability.

Solutions to the Problems

As a result of intensive studies, the present inventors have found that the above problem can be solved by a separator comprising a porous sheet and cellulose nanofibers, wherein the porous sheet comprises a binder component having the specified SP value, and the porous sheet has the cellulose nanofibers at the inside and on the surface thereof, and wherein the cellulose nanofibers are combined with the porous sheet by fusion of the binder component, and arrived at the present invention.

The present invention includes the following preferred embodiments.

[1] A separator comprising a porous sheet and cellulose nanofibers, wherein the porous sheet comprises a binder component having the SP value of 11 to 16 $(cal/cm^3)^{1/2}$, and the porous sheet has the cellulose nanofibers at the inside and on the surface thereof, and wherein the cellulose nanofibers are combined with the porous sheet by fusion of the binder component.

[2] The separator according to the above [1], wherein the porous sheet comprises a vinyl acetate-based resin fiber as a main fiber.

[3] The separator according to the above [2], wherein the porous sheet comprises a polyvinyl alcohol fiber as the main fiber.

[4] The separator according to any one of the above [1] to [3], wherein the binder component is based on a vinyl acetate-based resin fiber.

[5] The separator according to the above [4], wherein the binder component is based on a polyvinyl alcohol fiber.

[6] The separator according to any one of the above [1] to [5], wherein a number average fiber diameter of the cellulose nanofibers is 2 to 300 nm.

[7] The separator according to any (me of the above [1] to [6], wherein a thickness of the porous sheet is 30 to 250 μm.

[8] The separator according to any one of the above [1] to [7], wherein the porous sheet comprises mercerized pulp and/or a lyocell fiber as the main fiber.

[9] The separator according to any one of the above [1] to [8], wherein a decrease rate of an air permeability of the separator after stationarily leaving the separator in water for 30 minutes with respect to an air permeability of the porous sheet is 50% or more.

[10] A separator for an alkaline manganese dry battery, consisting of the separator according to any one of the above [1] to [9].

[11] A separator for a capacitor, consisting of the separator according to any one of the above [1] to [9].

Effects of the Invention

According to the present invention, a separator which has a combination of a preferable air permeability enabling high prevention of internal short circuit and a high retention rate of such an air permeability in an electrolytic solution, and has more improved uniformity of the air permeability can be provided.

EMBODIMENTS OF THE INVENTION

Figure 1:
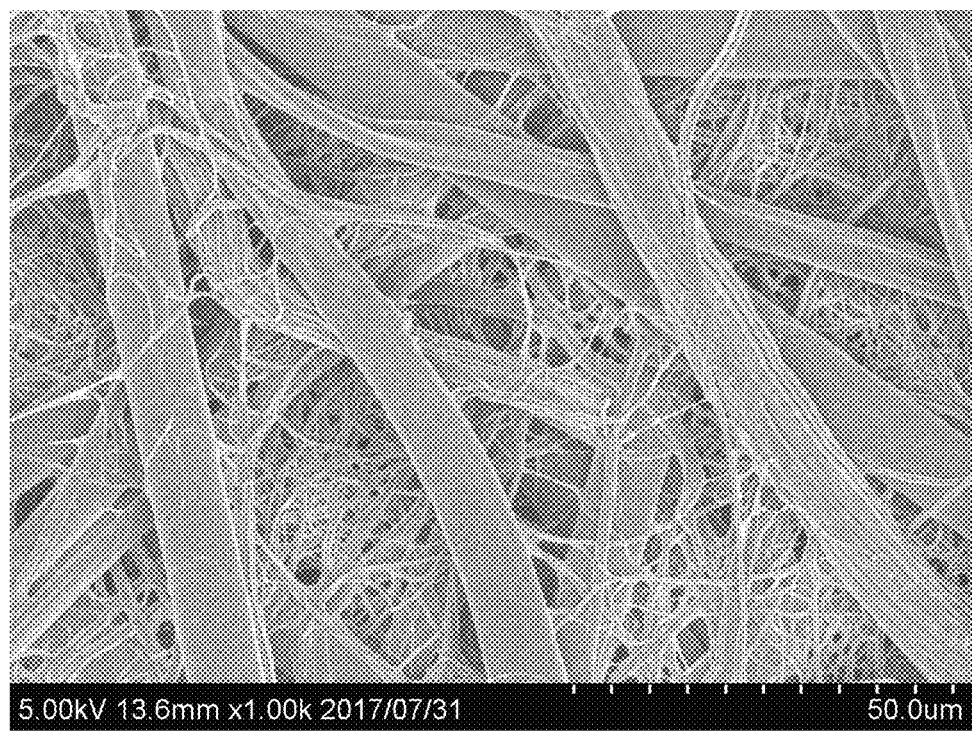
FIG. 1 is a scanning electron microscope observation image of the surface of the porous sheet produced in Example 2.

A separator of one embodiment of the present invention comprises a porous sheet and cellulose nanofibers. The porous sheet contains a binder component having the specified SP value, and has the cellulose nanofibers at the inside and on the surface thereof. The cellulose nanofibers are combined with the porous sheet by fusion of the binder component.

[Porous Sheet]

The porous sheet is not particularly limited as long as it is a sheet-shaped porous body comprising a number of continuous pores and has an insulation property. Examples of the porous sheet include a woven fabric, a knitted fabric, a nonwoven fabric and a paper, which are produced from a synthetic fiber, a semi-synthetic fiber, a natural fiber, an inorganic fiber, a regenerated fiber or the combination thereof. Examples of the synthetic fiber include a vinyl acetate-based resin fiber, a polyolefin-based fiber, a poly- amide fiber, an acrylic fiber, an aramid fiber and a conjugated fiber thereof. Examples of the semi-synthetic fiber include an acetate-based fiber. Examples of the natural fiber include natural pulp, cotton, hemp and linen. Examples of the inorganic fiber include a glass fiber and a ceramic fiber. Examples of the regenerated fiber include a rayon fiber, a cupra fiber and a lyocell fiber.

From the viewpoint of more readily obtaining a basic performance as a separator such as chemical resistance, a hydrophilic property and a mechanical performance, the porous sheet is preferably a nonwoven fabric produced by sheet-making with a wet-laid method by use of a synthetic fiber and/or a fibrillable alkali-resistant cellulose fiber which has good alkaline resistance. In the wet-laid method, a nonwoven fabric can be produced by refining the above synthetic fiber and/or the above alkali-resistant cellulose fiber as a main fiber into the predetermined fineness, adding a binder to the beaten fiber, mixing them, papermaking the obtained mixture, and drying the papermade product

[Main Fiber]

<Synthetic Fiber Having Good Alkaline Resistance>

As the above synthetic fiber which is used as a main fiber and has good alkaline resistance, it is preferred to use one or more selected from the group consisting of a vinyl acetate-based resin fiber such as a polyvinyl alcohol-based fiber, an ethylene-vinyl alcohol-based copolymer fiber and polypropylene/ethylene-vinyl alcohol-based copolymer conjugated fiber, a polyolefin-based fiber such as a polypropylene fiber and a polyethylene fiber, a polyamide fiber, a polypropylene/polyethylene conjugated fiber, and a polyamide/modified polyamide conjugated fiber. Among them, h is particularly preferred to use a vinyl acetate-based resin fiber, especially a polyvinyl alcohol-based fiber as a main fiber, which have a good affinity (wettability) with an electrolytic solution and high compatibility with the cellulose nanofibers contained in the separator. Therefore, in one embodiment of the present invention, the porous sheet preferably comprises a vinyl acetate-based resin fiber as a main fiber. It can be considered that the high compatibility between the cellulose nanofibers and the vinyl acetate-based resin fiber (especially the polyvinyl alcohol-based fiber) is caused by hydrogen bonding between the hydroxyl groups which both of the nanofiber and the fiber have.

The added amount of the synthetic fiber having good alkaline resistance is preferably 5 to 90% by mass, more preferably 20 to 85% by mass, based on the total mass of the main fiber and the binder mentioned below. When the added amount of the synthetic fiber having good alkaline resistance tails within the above range, good alkaline resistance and sufficient impact resistance of the separator can be more readily obtained, and a possibility of internal short circuit caused by buckling of the separator itself resulting from impact due to vibration or drop when transporting or carrying a battery is likely to be reduced.

In a case where a polyvinyl alcohol-based fiber is used as a main fiber, from fire viewpoint of preventing dissolution of the fiber during drying with a dryer in the papermaking step, it is preferred to use a polyvinyl alcohol-based fiber having a dissolution temperature in water of 90° C. or more, particularly 100° C. or more. Such a polyvinyl alcohol-based fiber may be specifically a fiber composed of a vinyl alcohol-based polymer having an average polymerization degree of 1000 to 5000 and a saponification degree of 95% by mole or more. Such a fiber can be used alone, or two or more of the fibers composed of vinyl alcohol-based polymers having different average polymerization degrees or saponification degrees each other can be used in combination. The average polymerization degree and the saponification degree can be measured, for example, according to JIS K 6726. The above vinyl alcohol-based polymer may be a homopolymer of vinyl alcohol (a polyvinyl alcohol fiber) or a copolymer comprising vinyl alcohol as a main component and other copolymerizable component(s). From the viewpoint of more readily obtaining high water resistance or the like, the amount of the other copolymerizable components) is preferably 20% by mole or less, more preferably 10% by mole or less. In addition, a treatment such as acetalization may be performed on the fiber. In one embodiment of the present invention, the porous sheet preferably comprises a polyvinyl alcohol fiber as a main fiber.

The polyvinyl alcohol-based fiber may be composed of only the vinyl alcohol-based polymer, comprise a polymer other than the vinyl alcohol-based polymer, or be a conjugated spun fiber or a blend spun fiber (a sea-island fiber) with other polymer(s). From the viewpoint of an electrolytic solution absorption property, it is preferable to use a polyvinyl alcohol fiber comprising a vinyl alcohol-based polymer in an amount of preferably 30% by mass or more, more preferably 50% by mass or more, particularly preferably 80% by mass or more. The fineness of such a fiber is preferably 3.3 dtex or less, mac preferably 15 dtex or less from the viewpoints of a separating property and thinning, and is preferably 0.01 dtex or more, more preferably 0.07 dtex or more from the viewpoint of a papermaking. The fiber length may be appropriately adopted depending on the single fiber fineness, but is preferably 0.5 to 10 mm, more preferably 1 to 5 mm from the viewpoint of the papermaking or the like.

The polyvinyl alcohol-based fiber can be produced, for example, by the following method. A polyvinyl alcohol-based polymer is dissolved at a concentration of 10 to 60% by mass in water, aid, by use of the obtained spinning dope, wet spinning is performed in a coagulation bath containing sodium hydroxide, sodium sulfate and the like. Then, roller drawing, neutralization, wet heat drawing, water washing and drying are performed to obtain a polyvinyl alcohol-based fiber. The drawing is performed at a drawing temperature of usually 200 to 250° C., preferably 220 to 240° C. The draw ratio is usually 5 times or more, preferably 6 times or more. Subsequently, the polyvinyl alcohol-based fiber was cut into a fiber having a fiber length foiling within the above desired range.

Such a polyvinyl alcohol-based fiber is commercially available, for example, as the vinylon main fiber from Kuraray Co., Ltd.

<Fibrillable Alkali-Resistant Cellulose Fiber (Alkali-Resistant Cellulose Fiber which can be Fibrillated)>

As the alkali-resistant cellulose fiber used as the main fiber, it is preferred to use one or more selected from the group consisting of a rayon fiber (including a polynosic rayon fiber, and an organic solvent-based cellulose fiber), an acetate-based fiber, pulp, and mercerized pulp (including mercerized natural pulp such as wood pulp, cotton linter pulp and hemp pulp).

These fibers can be fibrillated. Examples of a fibrillation method include a method in which one or more selected from the above group is dispersed in water, and beaten/refined to the predetermined freeness by use of a papermaking beat machine such as a beater, a disc refiner or a high-speed beat machine. In a case where a fibrillated alkali-resistant cellulose fiber is used as the main fiber, the refining degree as the value of CSF (Canadian Standard Freeness) is preferably 0 to 700 mL, more preferably 0 to 550 mL, and the added amount of the fibrillated alkali-resistant cellulose fiber is preferably 5 to 70% by mass, more preferably 20 to 60% by mass based on the total mass of the main fiber and a binder mentioned below. When the added amount of the fibrillated alkali-resistant cellulose fiber falls within the above range, sufficient impact resistance of the separator can be more readily obtained, and a possibility of internal short circuit caused by buckling of the separator itself resulting from impact due to vibration or drop when transporting or carrying a battery is likely to be reduced. The above freeness is a value measured by the Canadian standard method defined in JIS P8121.

From the viewpoint that the electrolytic solution is an aqueous potassium solution having a high concentration and thus has a high alkaline property, the mercerized pulp and/or organic solvent-based cellulose fiber is preferably used as the alkali-resistant cellulose fiber.

Preferred examples of the mercerized pulp include pulp obtained by mercerizing one or more selected from the group consisting of hardwood pulp, softwood pulp, eucalyptus pulp, esparto pulp, cotton linter pulp, pineapple pulp, Manila hemp pulp aid sisal hemp pulp.

In a case where the porous sheet comprises mercerized pulp as the main fiber, the added amount thereof is preferably 5 to 70% by mass, more preferably 10 to 40% by mass based on the total mass of the main fiber and the binder mentioned below. When the added amount of the mercerized pulp falls within the above range, sufficient impact resistance of the separator can be more readily obtained, and a preferable air permeability can be more readily maintained in an electrolytic solution.

Preferred examples of the organic solvent-based cellulose fiber include an organic solvent spun cellulose fiber produced by a method in which pinning dope obtained by dissolving cellulose in amine oxide is subjected to a dry-wet pirating in water, and a fiber obtained by deposition of the cellulose is drawn. A representative example of such a fiber is a lyocell fiber, and is commercially supplied as a trade name of "Tencel (registered trademark)" from Lenzing Fibers GmbH (Austria). The fineness of the organic solvent spun cellulose fiber is preferably 3.3 dtex or less, more preferably 1.5 dtex or less from the viewpoint of a separating property and thinning, and is preferably 0.01 dtex or more, more preferably 0.07 dtex or more from the viewpoint of a papermaking property. The fiber length may be appropriately determined depending on the single fiber fineness, but is preferably 0.5 to 10 mm, more preferably 1 to 5 mm from the viewpoint of the papermaking property and the like.

In a case the porous sheet comprises the organic solvent-based cellulose fiber as the main fiber, the added amount thereof is preferably 5 to 80% by mass, more preferably 20 to 60% by mass based on the total mass of the main fiber and the binder mentioned below. When the added amount of the organic solvent-based cellulose fiber falls within the above range, sufficient impact resistance of the separator can be more readily obtained, and a preferable air permeability can be more readily maintained in an electrolytic solution. When the preferable air permeability is maintained in the electrolytic solution, internal short circuit can highly remain prevented from the time of manufacture of a battery. As a result, deterioration of a battery j performance and a battery life can be more readily prevented.

In one embodiment of the present invention, the porous sheet preferably comprises mercerized pulp and/or a lyocell fiber as the main fiber. When the porous sheet comprises the mercerized pulp and/or lyocell fiber, sufficient impact resistance of the separator can be more readily obtained, and a preferable air permeability can be more readily maintained in an electrolytic solution.

In one embodiment of the present invention, the porous sheet preferably comprises, as the main fiber, a synthetic fiber having good alkaline resistance (preferably a vinyl acetate-based resin fiber, more preferably a polyvinyl alcohol-based fiber, especially preferably polyvinyl alcohol fiber) and a fibrillable alkali-resistant cellulose fiber (preferably mercerized pulp and/or an organic solvent-based cellulose fiber, more preferably mercerized pulp and/or a lyocell fiber). In this embodiment, the added amount of the synthetic fiber having good alkaline resistance is preferably 5 to 70% by mass, more preferably 20 to 60% by mass based on the total mass of the main fiber and the binder mentioned below, and the added amount of the fibrillable alkali-resistant cellulose fiber is preferably 5 to 80% by mass, more preferably 20 to 60% by mass based on the total mass of the main fiber and the binder mentioned below.

[Binder]

The binder component contained in the porous sheet bonds (adheres) the main fibers to each other, which forms the porous sheet. In addition, the binder component combines (bonds and adheres) the porous sheet and the cellulose nanofibers with its fusion. It can be considered that this combining remarkably prevents drop out of the cellulose nanofibers in an electrolytic solution when using the separator in a battery, and a preferable air permeability can be highly maintained in an electrolytic solution. The fusion means a state where the binder at least partially dissolves or melts by heat treatment to at least partially lose its shape (for example, a fiber shape in a case of a fibrous binder, a powdery shape in a case of a powdery binder or the like) and form at least part of the binder component.

As the binder, from the viewpoint that a combining property (bonding property and adhesion property) of the cellulose nanofibers and the porous sheet can be more readily improved, it is necessary to use the binder having the SP (Solubility parameter) value of 11 to 16 $(cal/cm^3)^{1/2}$ and it is more preferable to use the binder having the SP value of 10 to 15 $(cal/cm^3)^{1/2}$. The SP value refers to the solubility parameter and is a value specific to a substance. In this embodiment, as the SP value, the values are used described in "Polymer Hand Book (4th) Edition, (1999). Wiley-Interscience". The SP value can be experimentally measured, or estimated by use of an empirical approximation based on a molecular structure. Examples of the experimental measurement include a method of estimating from latent heat of vaporization, a method of estimating from surface tension, and a method of estimating from refractive index. Examples of the empirical approximation based on a molecular structure include the Bicerano method, the Hildebrand method, the Small method, the Fedors method, the Van Krevelen method, the Hansen method, the Hoy method, the Ascadskii method and the Okitsu method. In a case where the SP value of the binder is not described in "Polymer Hand Book (4th) Edition, (1999), Wiley-Interscience", the SP value may be obtained by any one of the above methods. The SP value is preferably obtained by the Fedors method from the viewpoint that the method is simple and availability of the method is proved. In this case, the unit of the SP value is $MPa^{1/2}$. The SP value can be converted by use of the following formula.

$$1\ (cal/cm^3)^{1/2}=2.046\ MPa^{1/2}$$

Examples of the binder having the above SP value include a vinyl acetate-based resin, a polyvinylidene chloride-based resin, an acrylonitrile-based resin and a polyamide-based resin. They can be used alone, or two or more of the binders can be used in combination.

From the viewpoint of alkaline resistance, an electrolytic solution absorption property, and compatibility with the cellulose nanofibers, it is preferable to use the vinyl acetate-based binder, especially the polyvinyl alcohol-based binder.

Examples of the form of the binder include a fibrous form, a powdery form and a solution form. In a case where the separator is sheet-made by a wet sheet-making, the fibrous binder is preferred. When the fibrous binder is used, the binder is not completely dissolved by controlling the amount of water introduced before drying to maintain the fiber form and achieve point-like adhesion of only the intersections of the binder fibers with the main fibers, and the strength of the separator can be maintained without deterioration of the electrolytic solution absorption property and increase of battery internal resistance. Therefore, the fibrous binder is preferably used.

In addition, in one embodiment of the present invention, the binder component is preferably based on the vinyl acetate-based resin fiber. Since the vinyl acetate-based resin fiber has high compatibility with the cellulose nanofibers contained in the separator, the combining property of the cellulose nanofibers and the porous sheet can be more readily improved. It can be considered that, as a result, drop out of the cellulose nanofibers in an electrolytic solution can be more readily prevented. As mentioned above, it can be considered that the high compatibility between the cellulose nanofibers and the vinyl acetate-based resin fiber is caused by hydrogen bonding between the hydroxyl groups which both of the nanofiber and the fiber have.

In a case where the polyvinyl alcohol-based fiber is used as the fibrous binder, from the viewpoint of the dissolubility in the drying step after papermaking and the spread of the binder, the dissolution temperature in water of tire fiber is preferably 40 to 90° C., more preferably 50 to 70° C. In addition, from the viewpoint of a viscosity during spun, physical properties after molding, dissolution temperature in water and the like, a fiber constituting of a polyvinyl alcohol-based polymer having an average polymerization degree of 500 to 3000 and a saponification degree of 97 to 99% by mole is preferably used. The average polymerization degree and the saponification degree can be measured according to, for example, the JIS-K 6726. The above vinyl alcohol-based polymer may be a homopolymer of vinyl alcohol (polyvinyl alcohol fiber) or a copolymer comprising vinyl alcohol as a main component and other copolymerizable component(s). From the viewpoint of more readily obtaining high water resistance or the like, the amount of the other copolymerizable component(s) is preferably 20% by mole or less, more preferably 10% by mole. In addition, a treatment such as acetalization may be performed on the fiber.

The polyvinyl alcohol-based fiber can be produced by, for example, the method exemplified as the production method of the polyvinyl alcohol-based fiber as the main fiber.

In addition, such a polyvinyl alcohol-based fiber is commercially available as, for example, the vinylon binder fiber from Kuraray Co., Ltd.

The polyvinyl alcohol-based fiber may be composed of only the vinyl alcohol-based polymer, comprise a polymer other than the vinyl alcohol-based polymer, or be a conjugated spun fiber or a blend spun fiber (a sea-island fiber) with other polymers). From the viewpoint of an electrolytic solution absorption property, a mechanical performance and the like, it is preferable to use a polyvinyl alcohol-based fiber comprising the vinyl alcohol-based polymer in amount of preferably 30% by mass or more, more preferably 50% by mass or more, especially preferably 80% by mass or more. The fineness of such a fiber is preferably 0.01 to 3 dtex from the viewpoint of water dispersibility, a bonding property with other component, pore size and the like, and the fiber length is preferably 1 to 5 mm.

In one embodiment of the present invention, the binder component is preferably based on the polyvinyl alcohol fiber. Since the polyvinyl alcohol fiber has especially high compatibility with the cellulose nanofibers contained in the separator, the combining property of the cellulose nanofibers and the porous sheet can be particularly and more readily improved. It can be considered that, as a result, drop out of the cellulose nanofibers in an electrolytic solution can be particularly and more readily prevented. As mentioned above, it can be considered that the high compatibility between the cellulose nanofibers and the vinyl acetate-based resin fiber is caused by hydrogen bonding between the hydroxyl groups which both of the nanofiber and the fiber have.

In contrast, when a binder not having the SP value of 11 to 16 $(cal/cm^3)^{1/2}$ is used, the effect of the present invention dial a preferable air permeability is maintained in an electrolytic solution cannot be obtained. That is, such a binder has poor compatibility with the cellulose nanofibers, and docs not bond or hardly bonds the cellulose nanofibers and the porous sheet. Therefore, when a separator produced by use of such a Under is used in a battery, the cellulose nanofibers remarkably drop out in an electrolytic solution, and the air permeability remarkably decreases. This is demonstrated in Comparative examples described later. When an air permeability increases, internal short circuit cannot be prevented, and a battery performance and a battery life decrease. Examples of such a binder include, for example, a polyester such as polyethylene terephthalate (PET) and a polyolefin such as polyethylene (PE).

The added amount of the binder fiber is preferably 5 to 30% by mass, more preferably 10 to 25% by mass based on the total mass of the main fiber and the binder fiber. When the added amount of the binder fiber fells within the above range, sufficient tensile strength of the separator required for an assembly process of a battery can be more readily obtained, a sufficient combining property of the cellulose nanofibers and the porous sheet can be more readily obtained, and problems such as a problem of decrease of an electrolytic solution absorption property due to too much added amount, and a problem of increase of electrical resistance due to blockage of pores between the fibers in the porous sheet hardly occur.

The production method of fee porous sheet is explained.

In a case where the porous sheet is a nonwoven fabric, fee porous sheet can be produced by, for example, a method in which fee synthetic fiber and/or fee fibrillable alkali-resistant cellulose fiber which has good alkaline resistance as fee main fiber is beaten to the predetermined freeness, fee above binder is added to the beaten/refine main fiber to mix them, and fee obtained mixture is subjected to a wet-laid method to produce a nonwoven fabric. The production of the nonwoven fabric by fee wet-laid method is not particularly limited. For example by use of a general wet papermaking machine, fee desired nonwoven fabric can be effectively produced. Examples of a papermaking net which can be used include a cylinder-paper machine, a short wire machine and a fourdrinier machine, and papermaking can be performed by a general papermaking method. In some cases, the papermaking can be performed by use of a combination of different types of the wires. Then, a wet-laid nonwoven fabric obtained by the wet-laid method is dried by a contact-type (for example, fee Yankee type) dryer to obtain a porous sheet as the nonwoven fabric.

The drying temperature of the wet-laid nonwoven fabric may be a temperature at which fee binder dissolves or melts to bond (adhere) the main fibers to each other and the main fibers and the binder do not decompose or deteriorate. The drying temperature is depending on a material used as the binder, and usually 70 to 150° C. preferably 80 to 130° C.

In one embodiment of the present invention, the thickness of the porous sheet is preferably 30 to 250 µm, more preferably 40 to 200 µm, especially preferably 55 to 150 µm. When fee thickness of the porous sheet fells within the above range, an ion conductivity, a mechanical performance, a shielding property of conductive materials and the like which are basic performances of the separator can be more readily obtained. The thickness of the porous sheet can be measured by the method described in the Examples below. The thickness of the porous sheet can be adjusted to an intended thickness by hot press or cold press as required.

[Cellulose Nanofiber]

The separator comprises the cellulose nanofibers in addition to the porous sheet. The porous sheet has the cellulose nanofibers at the inside and on the surface thereof, and the cellulose nanofibers are combined with the porous sheet by fusion of the binder component.

In one embodiment of the present invention, the number average fiber diameter of the cellulose nanofibers is preferably 2 to 300 nm, more preferably 2 to 250 nm. Among them, in a case where the separator of the present invention is used as a separator for an alkaline manganese dry battery mentioned below, the above number average fiber diameter is preferably 2.5 to 210 nm, more preferably 2.5 to 100 nm, further preferably 2.5 to 50 nm, particularly preferably 2.5 to 20 nm, even particularly preferably 2.5 to 10 nm. In a case where the separator of the present invention is used a separator for a capacitor mentioned below, the above number average fiber diameter is preferably 30 to 250 nm, further preferably 50 to 250 nm. When the number average fiber diameter of the cellulose nanofibers falls within the above range, more uniform average pore size of the separator can be more readily obtained, and thus, uniformity of more improved air permeability can be more readily obtained. In this embodiment, the number average fiber diameter can be measured by the method described in the Examples below.

The number average fiber length of the cellulose nanofibers is not particularly limited, and is preferably 0.1 to 10 µm, more preferably 0.2 to 7 µm. When the number average fiber length of the cellulose nanofibers falls within the above range, good dispersion in the dispersion step of the cellulose nanofibers mentioned below can be more readily achieved, and more uniform average pore size of the separator can be more readily obtained. Therefore, more improved uniformity of an air permeability can be more readily obtained. The number average fiber length means an average value of the fiber lengths obtained from an electron micrograph of fiber aggregate taken at 5000-fold magnification, and is an average value calculated from a numerical values obtained by randomly extracting 50 fibers and measuring their fiber lengths.

The cellulose nanofibers may form network structure of the cellulose nanofibers at the inside and on the surface thereof, although it is not particularly limited whether the network structure is formed or not. In a case where the network structure of the cellulose nanofibers is formed, the above binder component may be contained in the network structure. When the binder component is contained in the network structure of the cellulose nanofibers, a combining property of the cellulose nanofibers and the porous sheet can be more readily improved, and as a result drop out of the cellulose nanofibers can be more readily prevented in an electrolytic solution. In consequence, it can be considered that in the separator, a preferable air permeability enabling high prevention of internal short circuit and a high retention rate of such an air permeability in the electrolytic solution can more readily obtained.

A cellulose raw material which is the raw material of the cellulose-based nanofiber is not particularly limited. For example, the following raw materials may be used: craft pulp derived from various wood such as hardwood bleached craft pulp (LBKP) or softwood bleached craft pulp (NBKP), sulfite pulp, used paper pulp such as deinking pulp (DIP), mechanical pulp such as ground pulp (GP), pressure ground wood pulp (PGW), refiner ground wood pulp (RMP), thermo-mechanical pulp (TMP), chemi-thermo-mechanical pulp (CTMP), chemi-mechanical pulp (CMP) and chemi-ground pulp (CGP), a powdery cellulose obtained by crushing the above raw materials with a high pressure homogenizer, a mill or the like, or microcrystalline cellulose powder obtained by purifying the above raw materials with a chemical treatment such as acid hydrolysis. Plants such as kenaf, hemp, rice, bagasse, bamboo and cotton can be used. This embodiment is not limited by the raw material and production method of the nanofibers.

As the production method of the cellulose-based nanofiber, for example, the production method described in JP-A-2008-308802 can be used. According to the patent document, the production method of the cellulose-based nanofiber includes an oxidation reaction step in which natural cellulose is oxidized by using the natural cellulose as a raw material, using an N-oxyl compound as an oxidation catalyst in water and applying a co-oxidizing agent to obtain a reactant fiber, a purification step in which impurities are removed to obtain a water-impregnated reactant fiber, a dispersion step in which the water-impregnated reactant fiber is dispersed in a dispersion medium, and a drying step in which the dispersion medium is dried and removed from a dispersion obtained in the dispersion step.

In the oxidation reaction step, a dispersion liquid obtained by dispersing the natural cellulose in water is prepared. The dispersion medium of the natural cellulose in the reaction is water. The concentration of the natural cellulose in the reaction aqueous solution is appropriately selected as long as it is a concentration enabling sufficient diffusion of a reagent, and is usually 5% by mass or less related to the mass of the reaction aqueous solution.

A number of the N-oxyl compounds which can be used as the oxidation catalyst of the cellulose are reported (for example, in "Catalytic oxidation of cellulose by use of TEMPO derivatives: HPSEC and NMR analysis of oxidation product", I. Shibata and A. Isogai, "Cellulose", Vol. 10, 2003, pp. 335 to 341). Among them, TEMPO, 4-acetamide-TEMPO, 4-carboxy-TEMPO and 4-phosphonooxy-TEMPO are especially preferred from the viewpoint of a reaction rate at normal temperature in water. For the N-oxyl compound, an addition in a catalyst amount is sufficient That is, the N-oxyl compound is added to the reaction aqueous solution in a range of preferably 0.1 to 4 mmol/L, further preferably 0.2 to 2 mmol/L. When the added amount is less than 0.1 mmol/L, its catalytic effect may be sometimes inferior. When the added amount is more than 4 mmol/L, the N-oxyl compound cannot be sometimes dissolved in water.

The co-oxidizing agent is, for example, a hypohalogenous acid or its salt, a halogenous acid or its salt, a perhalogen acid or its salt, hydrogen peroxide and a perorganic acid, and preferably an alkali metal hypohalite. The alkali metal hypohalite is, for example, sodium hypochlorite and potassium hypobromite. In a case where sodium hypochlorite is used, the reaction is preferably performed in foe presence of an alkali metal bromide such as sodium bromide from the viewpoint of a reaction rate. The added amount of the alkali metal bromide is preferably 1 to 40-fold mole amount, more preferably 10 to 20-fold mole amount related to foe amount of foe N-oxyl compound. When the added amount is less than 1-fold mole amount, foe reaction rate may be sometimes inferior. When the added amount is more than 40-fold mole amount, the reaction rate may be sometimes inferior. The pH of foe reaction aqueous solution is preferably maintained in a rage of 8 to 11. The temperature of foe reaction aqueous solution can be appropriately selected in a range of 4 to 40° C., foe reaction can be performed at room temperature, and the control of the temperature is not especially needed. The added amount of the co-oxidizing agent is preferably in a range of 0.5 to 8 mmol related to 1 g of the natural cellulose. The reaction time is preferably 5 to 120 minutes, and foe reaction is usually completed within 240 minutes at the latest.

The purification step is a purification step by removing impurities such as unreacted hypochlorous acid and various by-products from an oxidized cellulose slurry obtained in the oxidation reaction step. At a stage after the oxidation reaction step, the oxidized celluloses are not usually dispersed to a nanofiber unit discretely. Therefore, an oxidized cellulose slurry purified to high purity (99% by mass or more) is obtained by a general purification method, that is, by repeating a water washing step and a filtration process. The oxidized cellulose shiny obtained by the above purification has a solid content (cellulose) concentration of preferably a range of 10 to 50% by mass, more preferably 15 to 30% by mass in a squeezed state. Considering the subsequent dispersion step, when the solid content concentration is more than 50% by mass, extremely high energy is required for dispersion, which is not preferable.

The dispersion step is a step obtaining a cellulose-based nanofiber dispersion liquid by dispersing foe oxidized cellulose slurry obtained in foe purification step in foe dispersion medium. As the dispersion medium, the dispersion medium exemplified as the dispersion medium which can be used in a preparation step of the dispersion liquid of the cellulose nanofibers mentioned below can be used. As a dispersing machine, a dispersing machine generally used as an industrial production machine can be used Examples of the generally used dispersing machine include a screw-type mixer, a paddle-type mixer, a disper-type mixer and a turbine-type mixer. In addition, when a more powerful device with a beat performance such as a homo mixer under high-speed rotation, a high pressure homogenizer, a super high pressure homogenizes an ultrasonic dispersion treatment, a beater, a disc-type refiner, a conical-type refiner, a double disc-type refiner and a grinder is used, more efficient and advanced downsizing can be achieved.

As the cellulose nanofiber, commercially available cellulose nanofiber can be used. Examples thereof include Reocrysta (registered trademark) manufactured by DKS Co. Ltd. and Cellenpia (registered trademark) manufactured by Nippon Paper Industries Co., Ltd.

[Production Method of Separator]

The separator of this embodiment can be produced by, for example, introducing the cellulose nanofibers at the inside and on the surface of the porous sheet produced by the wet-laid method mentioned above, and combining the cellulose nanofibers to the porous sheet by fusion of the binder component Examples of the introduction method of the cellulose nanofibers include a method of impregnating the porous sheet with a dispersion liquid of the cellulose nanofibers and drying, and a method of applying or spraying the dispersion liquid of the cellulose nanofibers to the porous sheet and drying.

[Preparation of Dispersion Liquid of Cellulose Nanofibers]

The dispersion liquid of the cellulose nanofibers can be produced by diluting a cellulose nanofiber dispersion to the desired concentration (solid content) or mixing the cellulose nanofibers and a dispersion medium so as to obtain the desired concentration. The above diluting method and mixing method are not particularly limited. The dispersion liquid can be obtained by a well-known mixer such as a screw-type mixer, a paddle-type mixer, a disper-type mixer or a turbine-type mixer. In addition, by use of a powerful device with a beat performance such as a homo mixer under high-speed rotation, a high pressure homogenizer, an ultrasonic dispersion treatment, a beater, a disc-type refiner, a conical-type refiner, a double disc-type refiner and a grinder, a dispersion liquid of more refined cellulose nanofibers can be obtained.

The used dispersion medium is preferably water from the viewpoint of a safety aspect, an environmental aspect, an equipment aspect and the like. However, if necessary, an organic solvent can be used by itself, or a mixed solvent of an organic solvent with a hydrophilic property and water can be used. Examples of the organic solvent include hydrocarbons such as hexane, benzene and toluene, alcohols such as methanol, ethanol, isopropanol, isobutanol, sec-butanol, tert-butanol, 2-methoxyethanol, 2-ethoxyethanol, ethylene glycol and glycerin, ethers such as ethylene glycol dimethyl ether, 1,4-dioxane and tetrahydrofuran, ketones such as acetone and methyl ethyl ketone, and N,N-dimethylformamide, N,N-dimethylacetamide and dimethyl sulfoxide.

The concentration of the cellulose nanofibers in the dispersion liquid at the time of introduction of the cellulose nanofibers to the porous sheet is preferably 0.001 to 5.000% by mass, more preferably 0.010 to 2.000% by mass, especially preferably 0.03 to 1.000% by mass, most preferably 0.03 to 0.500% by mass based on the total mass of the dispersion liquid. When the concentration of the cellulose nanofibers fells within the above range, the cellulose nanofibers can be more uniformly and more readily combined at the inside and on the surface of the porous sheet, and more uniform average pore size of the separator can be more readily obtained. Therefore, more improved uniformity of an air permeability of the separator can be more readily obtained.

In one embodiment of the present invention, a surfactant may be further added to the dispersion liquid in an amount of preferably 0.0001 to 1.0000% by mass based on the total mass of the dispersion liquid. The concentration of the surfactant is more preferably 0.0010 to 0.7000% by mass, especially preferably 0.0100 to 0.500% by mass. When the surfactant is further added in the concentration falling within the above range, aggregation of the cellulose nanofibers in the dispersion liquid can be more readily suppressed, aggregation of the cellulose nanofibers during drying described later can be more readily suppressed, and cellulose nanofibers can be more uniformly and more readily combined at the inside and on the surface of the porous sheet. As a result, more improved uniformity of an air permeability of the separator can be more readily obtained. As the surfactant, for example, a cationic surfactant an anionic surfactant, a nonionic surfactant or an ampholytic surfactant can be used. In this embodiment the surfactant is preferably the cationic surfactant more preferably an alkyl ammonium salt or a perfluoroalkyl ammonium salt Among them, it is especially preferred to use dodecyltrimethylammonium bromide, octyltrimethylammonium bromide, or cetyltrimethylammonium bromide which is the alkyl ammonium salt.

[Adhesion]

A method of adhering the above dispersion liquid to the porous sheet is not particularly limited. Examples thereof include a method of impregnating the porous sheet with a dispersion liquid, and a method of applying or spraying the dispersion liquid of the cellulose nanofibers to the porous sheet.

Examples of the method of impregnating the porous sheet with a dispersion liquid include a method of completely impregnating the porous sheet with the dispersion liquid, and a method of impregnating only the surface of the porous sheet with the dispersion liquid. In the method of completely impregnating the porous sheet with the dispersion liquid, the dispersion liquid can be penetrated efficiently and surely to the inside of the pores of the porous sheet. Therefore, a separator in which the cellulose nanofibers are more uniformly combined at the inside and on the surface of the porous sheet after the drying step described later can be more readily obtained, and, as a result, more improved uniformity of an air permeability of the separator can be more readily obtained. The impregnation step may be performed under reduced pressure. When reduced pressure is applied, air in the porous sheet can be more readily removed, and the dispersion liquid can be penetrated efficiently and surely. Excess dispersion liquid may be removed from the porous sheet surface. Examples of the removal method include a method by use of a roll dewatering machine (for example, a mangle), vacuum dewatering, absorbent felt, absorbent paper or the like.

In the method of applying the dispersion liquid of the cellulose nanofibers to the porous sheet, a well-known applicator can be used. Examples of such an applicator include an air knife coater, a roll coater, a bar coater, a comma coater, a blade coater and a curtain coater. When the method of applying the dispersion liquid of the cellulose nanofibers is used, the adhesion amount of the dispersion liquid to the porous sheet can be more readily controlled.

In the method of spraying the dispersion liquid of the cellulose nanofibers to the porous sheet, a well-known sprayer can be used. Examples of such a sprayer include an atomizer and a spray.

The adhesion amount of the dispersion liquid can be appropriately adjusted depending on the material, thickness, average pore size and adhesion form of the porous sheet, and is for example 1 to 200 $g/m^2$, preferably 10 to 100 $g/m^2$ per unit area of the porous sheet. When the adhesion amount of the dispersion liquid falls within the above range, the dispersion liquid can sufficiently and more readily spread at the inside and on the surface of the porous sheet, a problem of deterioration of ion permeability due to excess amount of the dispersion liquid hardly occurs. The adhesion amount of the dispersion liquid can be adjusted by selecting the adhesion method, and by use of a roll dewatering machine (for example, a mangle), vacuum dewatering, absorbent felt, absorbent paper or the like.

[Drying]

Next, the porous sheet to which the dispersion liquid was adhered is thermally dried to obtain the separator. By this thermal drying, the binder component contained in the porous sheet is redissolved or remelted, and the redissolved or remelted binder component combines the cellulose nanofibers existing at the inside and on the surface of the porous sheet to the porous sheet. The drying temperature has to be a temperature at which the main fiber, the binder and the cellulose nanofibers do not decompose or deteriorate. Therefore, the above thermally drying temperature is preferably 10 to 120° C., more preferably 30 to 70° C. higher than the dissolution temperature in water or the melting temperature in water of the binder component. In a case where the vinyl acetate-based resin is used as the binder, the above thermally drying temperature is usually 80 to 150° C., preferably 85 to 130° C.

The porous sheet to which the dispersion liquid of the cellulose nanofibers was adhered is preferably dried by a contact-type (for example, the Yankee type) dryer. When the contact-type dryer is used, a lot of the binder component and cellulose nanofibers move to the dryer surface with water, and thus, combining area of the cellulose nanofibers and the binder component can become large. As a result, the cellulose nanofibers can strongly combine with the porous sheet, and drop out of the cellulose nanofibers from the porous sheet can be further prevented in an electrolytic solution.

Since the cellulose nanofibers usually bond to each other by hydrogen bonding, high strength can be exhibited in the dry state. However, since an aqueous potassium hydroxide solution is used as an electrolytic solution especially in an alkaline manganese dry battery, hydrogen bonding between cellulose nanofibers is likely to be broken, drop out of the cellulose nanofibers from the separator is likely to occur, and denseness of the separator decreases. It can be considered that, in this embodiment, a high retention rate of a preferable air permeability can be achieved in the electrolytic solution, since the porous sheet and the cellulose nanofibers are strongly bonded by combining the cellulose nanofibers with the porous sheet by fusion of the binder component, and this bonding prevents drop out of the cellulose nanofibers from the separator.

In one embodiment of the present invention, the air permeability of the separator is preferably 0.1 to 20 cc/cm$^2$/second, more preferably 0.1 to 17 cc/cm$^2$/second, especially preferably 0.1 to 15.5 cc/cm$^2$/second. When the air permeability fells within the above range, internal short circuit can be more highly and more readily prevented, sufficient ion permeability can be more readily maintained, and low internal resistance can be more readily obtained. The air permeability can be adjusted to the above range by selecting the types and the added ratio of the main fiber and the binder, the adhesion amount of the cellulose nanofiber dispersion during adhesion of the cellulose nanofiber dispersion to the porous sheet, or the solid content of the cellulose nanofibers in the cellulose nanofiber dispersion. The air permeability can be measured by the method described in the Examples below.

The separator of the present invention has more improved uniformity of an air permeability. The uniformity of the air permeability of the separator can be evaluated with, for example, standard deviation of pore size distribution of the separator.

In one embodiment of the present invention, the decrease rate of the air permeability of the separator after stationary leaving the separator in water for 30 minutes related to the air permeability of the porous sheet is preferably 50% or more, more preferably 52% or more, especially preferably 54% or more. The above decrease rate is usually 90% or less. The decrease rate higher than the lower limit value means that high denseness is maintained after stationary leaving in water. Therefore, it can be considered that drop out of the cellulose nanofibers is highly prevented. The decrease rate of the air permeability can be calculated by the method described in the Examples below.

In another embodiment of the present invention, separator for an alkaline manganese dry battery consisting of the above separator is also provided.

By use of the separator for an alkaline manganese dry battery of the above embodiment, an alkaline manganese dry battery having a high performance to withstand a heavy load discharge performance and having a long life can be obtained. The form of the separator in the alkaline manganese dry battery is not particularly limited. Examples thereof include cross-trip (cross structure bottomed cylindrical separator), round strip (wound cylindrical separator), and spiral (spiral wound structure separator).

For electrode materials used in the above alkaline manganese dry battery, zinc oxide can be used as an anode active material, an aqueous potassium hydroxide solution having a concentration of 40% by mass can be used as an electrolytic solution, and a gelatinous material consisting of a gelling agent and zinc powder can be used. As the zinc powder, it is preferred to use zinc powder to which mercury, cadmium and lead are not added. As the zinc powder, it is particularly preferred to use zinc alloy powder comprising zinc and at least one selected from the group consisting of bismuth, indium, calcium and aluminum. For a positive electrode, a positive electrode mixture comprising manganese dioxide and graphite as main constitution materials can be used. As the positive electrode mixture, it is preferred to use a positive electrode mixture comprising nickel oxyhydroxide which is used for an alkaline battery with a good heavy load discharge performance. From the viewpoint of ensuring superiority of a heavy load discharge performance and its retention performance, more preferably content ratio of manganese dioxide to nickel oxyhydroxide is manganese dioxide:nickel oxyhydroxide=80:20 to 40:60 (part by mass).

In another embodiment of the present invention, a separator for a capacitor consisting of the above separator is provided. By use of the separator for a capacitor of the above embodiment, a capacitor with high leakage current shielding and a long life can be obtained.

EXAMPLE

Hereinafter, the present invention will be more specifically explained with reference to Examples and Comparative examples, but the present invention is not limited to these examples. In Examples and Comparative examples, physical property values were measured by the following methods.

[Number Average Fiber Diameter of Cellulose Nanofiber]

An aqueous dispersion liquid of cellulose nanofibers having a solid content of 0.05 to 0.1 part by mass was prepared, and the dispersion liquid was casted on a carbon film-coated grid which had been subjected to hydrophilic treatment to prepare a TEM (transmission electron microscope) observation sample. In a case where a fiber having a large fiber diameter is contained, the dispersion liquid was casted on a glass to prepare a SEM (scanning electron microscope) observation sample. Observation with an electron microscope image was performed at a magnification of 5000-fold, 10000-fold or 50000-fold depending on constituent fibers. When axes of arbitrary image width vertically and horizontally were assumed in the obtained image, an image and observation conditions (magnification and the like) showing that at least 20 or more fibers intersect the axes were adopted for an observation image. Random vertical and horizontal axes for each image were drawn, the fiber diameters of the fibers intersecting the axes were read. At least three images not overlapping each other were adopted as the observation images (Therefore, the fiber diameters of at least 120 (=at least 20×2×3) fibers were read). The average value of the obtained data of the fiber diameters was calculated as a number average fiber diameter.

[Thickness of Porous Sheet]

After the prepared porous sheet was left under the standard environment (20° C.×65% RH) for 4 hours or more, thicknesses at 5 points were measured by use of PEACOCK Dial-Thickness Gauge H Type ($\varphi$10 mm×180 g/cm$^2$), and its average value was calculated as the thickness of the porous sheet.

[Measurement of Air Permeability]

An air permeability was measured according to the Frazier method of JIS LI 913:2010 "General non woven fabric test method, air permeability".

[SEM Observation of Separator Surface]

For a separator (after addition of cellulose nanofibers) and a porous sheet (before addition of cellulose nanofibers) for comparison, surface observation was performed by use of SEM.

[Microscope Observation of Cellulose Nanofibers in Separator by Use of Methylene Blue]

In order to ascertain that cellulose nanofibers exist at the inside and on the surface of a porous sheet, by use of the following procedure, a separator was dyed with a cationic dye (methylene blue), and the dyed separator was observed with a microscope.

The porous sheet is dyed with the cationic dye due to physical adsorption of the cationic dye on the polyvinyl alcohol fiber or component. In contrast, the cellulose nanofibers oxidized with a TEMPO oxidation catalyst are dyed with the cationic dye, since they have a carboxyl group. A separator and a porous sheet for comparison each cut into 2 cm×4 cm were put into 100 mL of an aqueous methylene blue (manufactured by Wako Pure Chemical Industries, Ltd.) solution prepared so as to have a concentration of 0.01% by mass, and were stationary left for 1 hour. After removing the samples, each sample was washed with a large amount of water, and each washed sample was dried at 60° C. in an air supply low-temperature dryer (manufactured by Yamato Scientific Co., Ltd.) for 1 hour. Each samples after drying was observed with DIGITAL MICROSCOPE (manufactured by KEYENCE Corporation).

[Microscope Observation of Binder Component in Separator with Iodine]

A binder component is dyed with the color of navy blue with iodine. By use of it, it was ascertained that a binder component was melted, and cellulose nanofibers were combined with a porous sheet by fusion of a melted binder component. Concretely, after the porous sheet and separator of Example 2 and the separator of Comparative example 3 were put into an aqueous iodine solution having a concentration of 0.1% by mole, each of them were immersed for 5 seconds, dried in air for 1 hour, and observed with DIGITAL MICROSCOPE (manufactured by KEYENCE Corporation).

The following materials were used in Examples and Comparative examples.

[Main Fiber]

Polyvinyl alcohol main fiber: 0.55 dtex×3 mm, manufactured by Kuraray Co., Ltd.

PET main fiber: 0.55 dtex×3 mm, manufactured by Kuraray Co., Ltd.

Tencel (registered trademark): lyocell fiber, 1.7 dtex×3 mm, manufactured by Lenzing Fibers GmbH

[Binder Fiber]

Polyvinyl alcohol binder fiber 1.1 dtex×3 mm, a SP value of 12.6 (cal/cm$^3$)$^{1/2}$, a dissolution temperature in water of 60° C., manufactured by Kuraray Co., Ltd.

PET binder fiber: 1.12 dtex×3 mm, a SP value of 10.7 (cal/cm$^3$)$^{1/2}$, a melting temperature in water of 110° C., manufactured by Kuraray Co., Ltd.

[Cellulose Nanofiber]

(I) a number average fiber diameter of 3 to 4 nm, manufactured by Nippon Paper Industries Co., Ltd.

(II) a number average fiber diameter of 200 nm, manufactured by Daicel FineChem Ltd.

Example 1

The above polyvinyl alcohol main fibers (1.6 g) (80% by mass based on the total mass of the main fibers and the Under fibers) and 0.4 g of the above polyvinyl alcohol binder fibers (20% by mass based on the total mass of the main fibers and the binder fibers) were dispersed in 1.5 L of water, and a wet porous sheet having a size of 25 cm×25 cm was prepared by use of the square sheet machine (manufactured by KUMAGAI RIKI KOGYO Co., Ltd.) and dried at 120° C. in the ROTARY DRYER (manufactured by KUMAGAI RIKI KOGYO Co., Ltd.) for 1 minute to prepare a porous sheet. The thickness and air permeability [hereinafter, referred to as "air permeability (porous sheet)"] of the obtained porous sheet were measured.

Ion-exchanged water (6 kg) was added to the 3 kg of an aqueous dispersion comprising the above cellulose nanofibers (I) (a number average fiber diameter of 3 to 4 nm) in a solid content of 1% by mass based on the total mass of the aqueous dispersion, dispersion treatment was performed by use of T. K. homomixer MARK II (Tokushu Kika Kogyo Co., Ltd.) for 10 minutes, and a cellulose nanofiber aqueous dispersion having a solid content of about 0.33% by mass based on the total mass of the aqueous dispersion was prepared.

The prepared porous sheet was immersed in the prepared cellulose nanofiber aqueous dispersion, and water content was adjusted to about 200% by use of the mangle (manufactured by Tsujii Senki Kogyo Industry Co., Ltd.). The dispersion liquid adhesion amount per unit area of the porous sheet was 60 g/m$^2$. After drying at 110° C. by use of the ROTARY DRYER, for 1 minute, the air permeability of the obtained separator [hereinafter, referred to as "air permeability (separator)"] was measured.

In addition, in order to evaluate the retention rale of the air permeability after stationary leaving in water, the separator was left in water for 30 minutes, and then, the separator was removed from water and dried at 120° C. by use of the ROTARY DRYER for 1 minute, and the air permeability [hereinafter, referred to as "air permeability (after washing separator)"] was measured.

The types and amounts of the used main fibers and binder fibers, and the drying conditions are summarized in Table 1, and the evaluation results of the porous sheet and separator are summarized in Table 2.

Example 2

Figure 3:
FIG. 3 is a microscope observation image of the surface of the porous sheet produced in Example 2 after dyeing the porous sheet with methylene blue.
Figure 4:
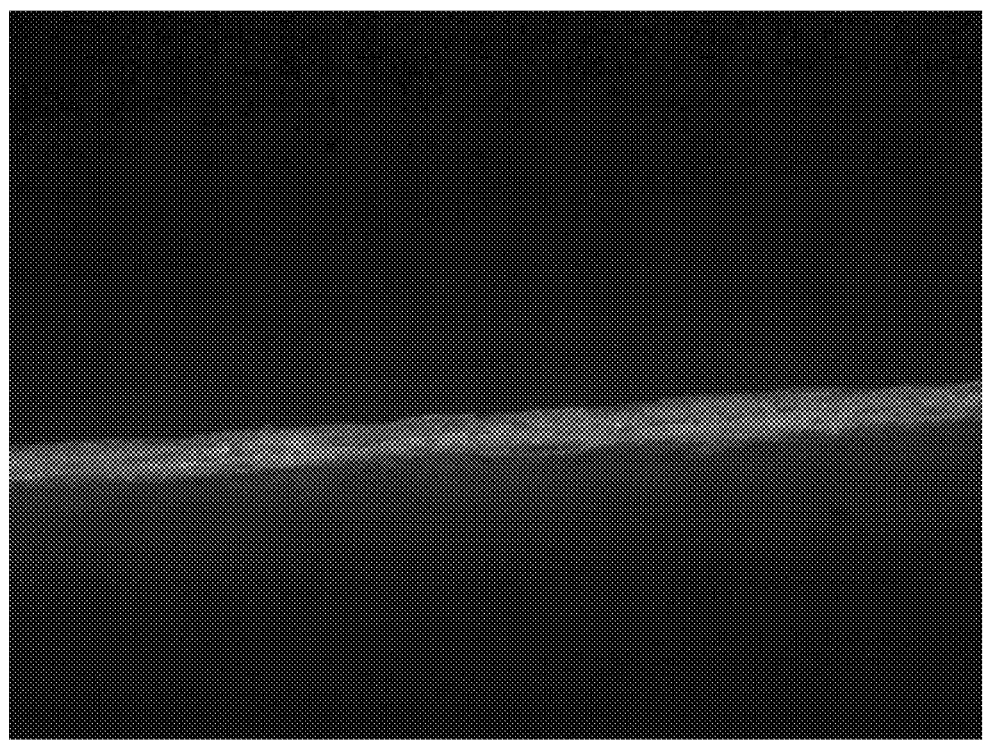
FIG. 4 is a microscope observation image of the cross section of the porous sheet produced in Example 2 after dyeing the porous sheet with methylene blue.

A porous sheet was prepared in the same manner as in Example 1 except that 0.8 g of the above polyvinyl alcohol main fibers (40% by mass based on the total mass of the main fibers and the binder fibers), 0.9 g of the above Tencel (registered trademark) (45% by mass based on the total mass of the main fibers and the binder fibers) and 03 g of the above polyvinyl alcohol binder fibers (15% by mass based on the total mass of the main fibers and the binder fibers) were used. The thickness and air permeability (porous sheet) of the prepared parous sheet were measured. In addition, for the obtained porous sheet, as a blank, SEM observation, microscope observation after dyeing with methylene blue and microscope observation after dyeing with iodine were performed. The results are shown in FIG. 1 (SEM observation image), FIGS. 3 and 4 (microscope observation image after dyeing with methylene blue), and FIG. 7 (microscope observation image after dyeing with iodine).

Figure 2:
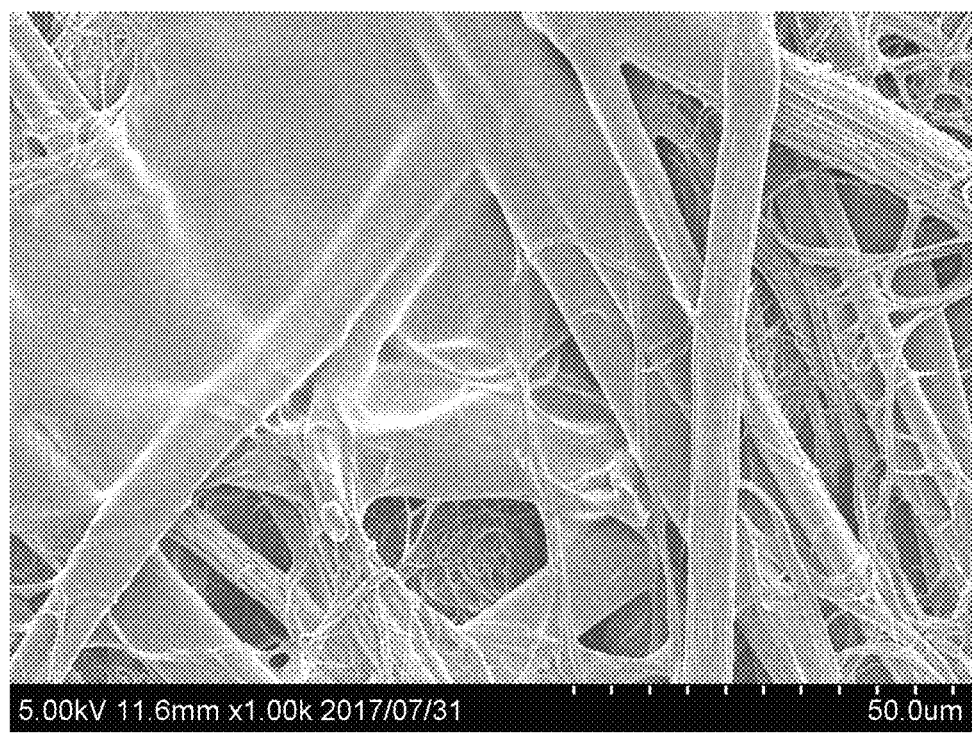
FIG. 2 is a scanning electron microscope observation image of the surface of the separator produced according to Example 2.
Figure 5:
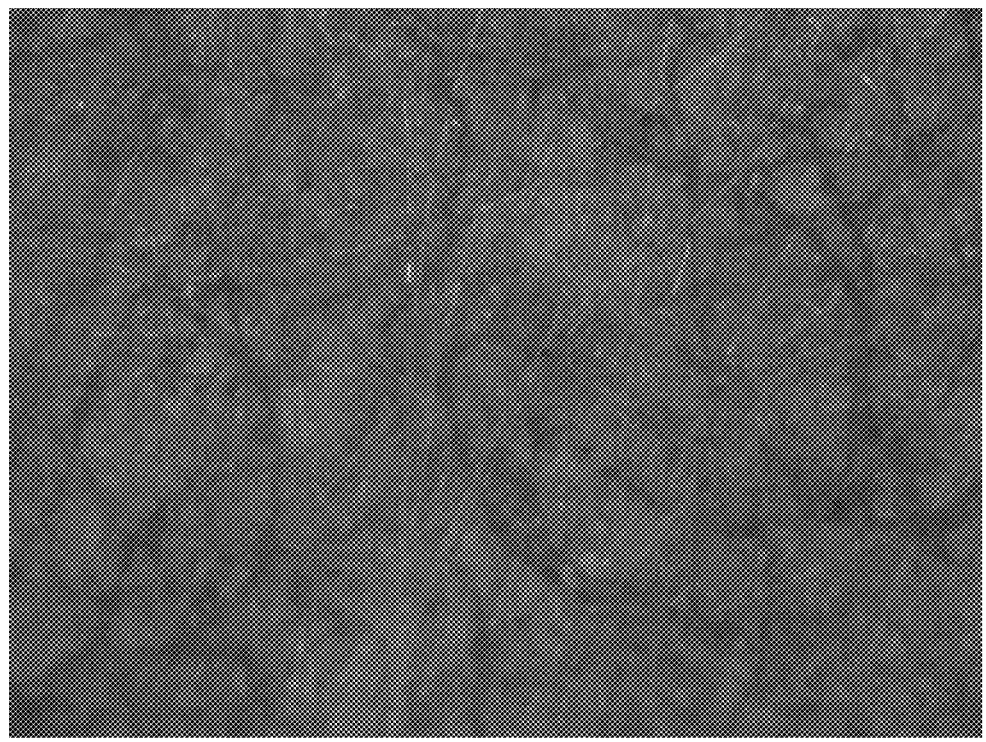
FIG. 5 is a microscope observation image of the surface of the separator produced according to Example 2 after dyeing the separator with methylene blue.
Figure 6:
FIG. 6 is a microscope observation image of the cross section of the separator produced in Example 2 after dyeing the separator with methylene blue.

Next, a separator was prepared by use of the above prepared porous sheet, and the air permeability (separator) was measured in the same manner as in Example 1. In order to observe the cellulose nanofibers on the surface of the obtained separator, SEM observation was performed. In addition, in order to ascertain that the cellulose nanofibers exist at the inside and on the surface of the porous sheet, microscope observation after dyeing with methylene blue was performed. Furthermore, in order to ascertain that the binder fibers dissolve or melt and the cellulose nanofibers are combined with the porous sheet by fusion of the melted binder component, microscope observation after dyeing with iodine was performed. The results are shown in FIG. 2 (SEM observation image), FIGS. 5 and 6 (microscope observation image after dyeing with methylene blue), and FIG. 8 (microscope observation image after dyeing with iodine).

In comparison with the porous sheets (FIGS. 3 and 4), the separators (FIGS. 5 and 6) have deeper blue dyeing (darker in Figures). Therefore, it was found that the cellulose nanofibers existed at the inside and on the surface of the porous sheet in the separator.

Figure 7:
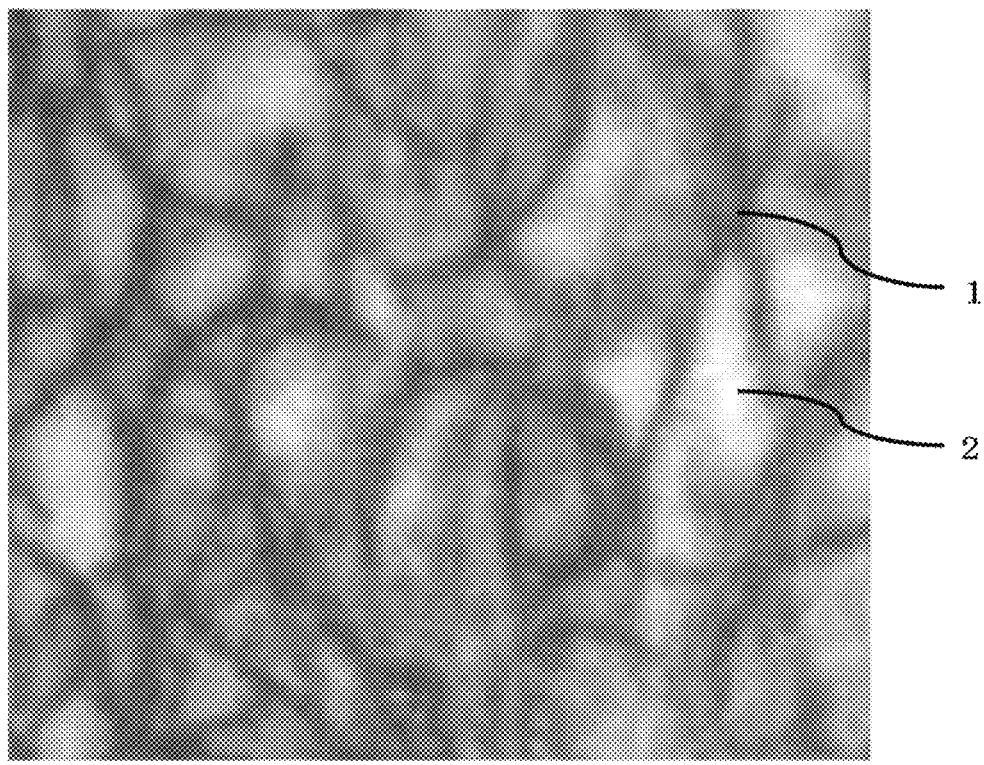
FIG. 7 is a microscope observation image of the surface of the porous sheet produced in Example 2 after dyeing the porous sheet with iodine.
Figure 8:
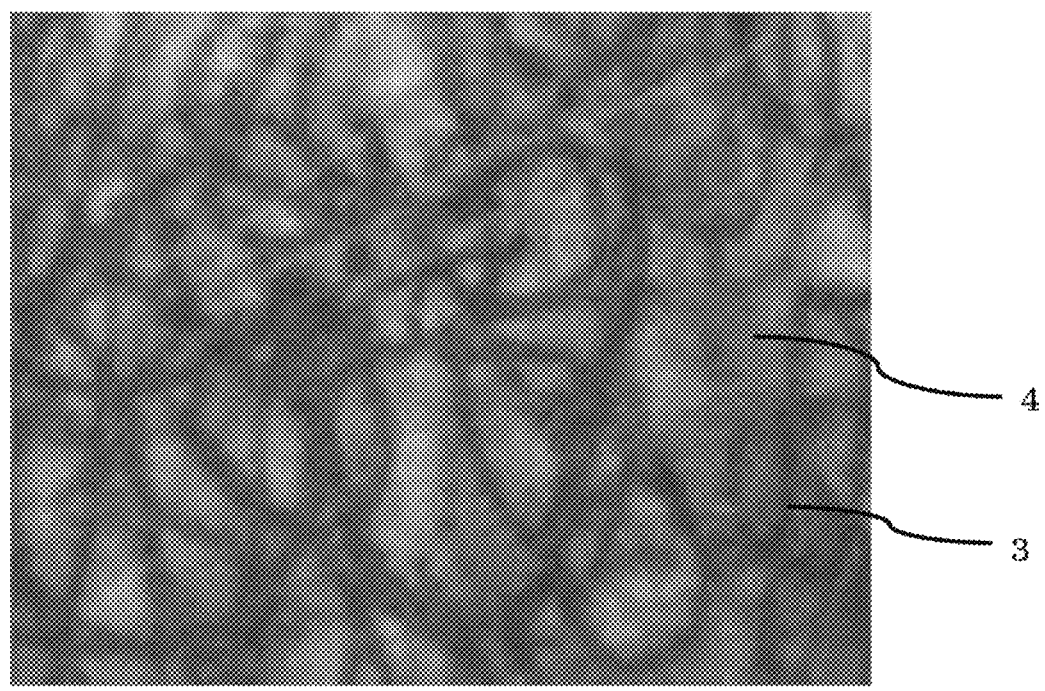
FIG. 8 is a microscope observation image of the surface of the separator produced according to Example 2 after dyeing the separator with iodine.

In FIGS. 7 and 8, the linear parts 1 and 3 dyed with the color of dark navy blue (dark color in Figures) are the binder fibers whose crystal structure was destroyed and partially melted by heating, and the part 4 dyed with the color of navy blue (dim color in Figures) is the binder component which was obtained by further melting and spreading the binder fibers and which bonds the main fibers and the cellulose nanofibers. In FIG. 7, the part 2 which is not dyed is an area in which the binder component is virtually absent. The main fibers and cellulose nanofibers are not dyed with this measurement method. Compared to FIG. 7, in FIG. 8, area of the navy blue part 4 between the binder fibers is larger and dyed with the color of darker color. Therefore, it is found that part of the binder fibers are further melted and fused to the main fibers and the cellulose nanofibers, and that the cellulose nanofibers are combined with the porous sheet by fusion of the binder component.

Next, the static test in water and drying were performed and the air permeability (after washing separator) was measured in the same manner as in Example 1 except that the drying after the static test in water was performed at 40° C. in the air supply low-temperature dryer (manufactured by Yamato Scientific Co., Ltd.) for 2 hours.

In order to evaluate the drop out property in an alkaline aqueous solution, a different separator from the separator subjected to the static test in water was immersed in an aqueous KOH solution having a concentration of 35% by mass for 24 hours, washed with running water for 30 minutes, and dried at 40° C. by use of the air supply low-temperature dryer (manufactured by Yamato Scientific Co., Ltd.) for 2 hours. The air permeability thereof [hereinafter, referred to as "air permeability (after immersion of separator in alkali)"] was measured.

The types and amounts of the used main fibers and binder fibers, and the drying conditions are summarized in Table 1, and the evaluation results of the porous sheet and separator are summarized in Table 2.

Example 3

A porous sheet was prepared in the same manner as in Example 1 except that 0.9 g of the above polyvinyl alcohol main fibers (45% by mass based on the total mass of the main fibers and the binder fibers), 0.8 g of the above Tencel (registered trademark) (40% by mass based on the total mass of the main fibers and the binder fibers) and 0.3 g of the above polyvinyl alcohol binder fibers (15% by mass based on the total mass of the main fibers and the binder fibers) were used. The thickness and air permeability (porous sheet) of the prepared porous sheet were measured.

Next, a separator was prepared, the static test in water and the drying were performed, and the air permeability (separator) and the air permeability (after washing separator) were measured in the same manner as in Example 1 except that the above prepared porous sheet was used, the drying after immersion in the cellulose nanofiber aqueous dispersion was performed at 90° C. by use of the ROTARY DRYER (manufactured by KUMAGAI RIKI KOGYO Co., Ltd.) for 1 minute, and drying after the static test in water was performed at 40° C. by use of foe air supply low-temperature dryer (manufactured by Yamato Scientific Co., Ltd.) for 2 hours.

The types and amounts of the used main fibers and binder fibers, and the drying conditions are summarized in Table 1, and the evaluation results of the porous sheet and separator are summarized in Table 2.

Example 4

Ion-exchanged water (8.0 kg) was added to 2.0 kg of the aqueous dispersion comprising foe above cellulose nanofiber (II) (a number average fiber diameter of 200 nm) in a solid content of 25% by mass based on the total mass of foe aqueous dispersion, and dispersion treatment was performed by use of the T.K. homomixer MARK II (Tokushu Kika Kogyo Co., Ltd.) for 10 minutes, to prepare a cellulose nanofiber aqueous dispersion having a solid content of 5% by mass based on the total mass of the aqueous dispersion.

Next, a separator was prepared, the static test in water and the drying were performed, and the air permeability (separator) and foe air permeability (after washing separator) were measured in foe same manner as in Example 2 except that foe cellulose nanofiber aqueous dispersion of Example 2 was changed to the above prepared cellulose nanofiber aqueous dispersion.

The types and amounts of the used main fibers and binder fibers, and foe drying conditions are summarized in Table 1, and foe evaluation results of the porous sheet and separator are summarized in Table 2.

Comparative Example 1

A porous sheet was prepared in the sane manner as in Example 1 except that 1.6 g of foe above PET main fibers (80% by mass based on the total mass of foe main fibers and the binder fibers) and 0.4 g of the above PET binder fibers (20% by mass based car the total mass of the main fibers and foe binder fibers) were used. The thickness and air permeability (porous sheet) of foe prepared porous sheet were measured.

Next, a separator was prepared, the static test in water and the drying were performed, and foe air permeability (separator) and the air permeability (after washing separator) were measured in the same manner as in Example 1 except that the above prepared porous sheet was used.

The types and amounts of the used main fibers and binder fibers, and the drying conditions are summarized in Table 1, and the evaluation results of the porous sheet and separator are summarized in Table 2.

Comparative Example 2

A porous sheet was prepared in the same manner as in Example 1 except that 0.9 g of the above PET main fibers (45% by mass based on the total mass of the main fibers and the binder fibers), 0.8 g of the above Tencel (registered trademark) (40% by mass based on the total mass of the main fibers and the binder fibers) and 03 g of the above PET binder fibers (15% by mass based on the total mass of the main fibers and the binder fibers) were used and the TAPPI papermaking machine was used. The thickness and air permeability (porous sheet) of the prepared porous sheet were measured.

Next, a separator was prepared, the static test in water and the drying were performed, and the air permeability (separator) and the air permeability (after washing separator) were measured in the same manner as in Example 1 except that the above prepared porous sheet was used, drying after immersion in the cellulose nanofiber aqueous dispersion was performed at 90° C. by use of the hot air dryer for 10 minutes, and drying after the static test in water was performed at 40° C. by use of the air supply low-temperature dryer (manufactured by Yamato Scientific Co., Ltd.) for 2 hours.

The types and amounts of the used main fibers and binder fibers, and the drying conditions are summarized in Table 1, and the evaluation results of the porous sheet and separator are summarized in Table 2.

Comparative Example 3

A porous sheet was prepared in the same manner as in Example 1 except that 0.9 g of the above polyvinyl alcohol main fibers (45% by mass based on the total mass of the main fibers and the binder fibers), 0.8 g of the above Tencel (registered trademark) (40% by mass based on the total mass of the main fibers and the binder fibers) and 0.3 g of the above polyvinyl alcohol binder fibers (15% by mass based on the total mass of the main fibers and the binder fibers) were used. The thickness and air permeability (porous sheet) of the prepared porous sheet were measured.

Figure 9:
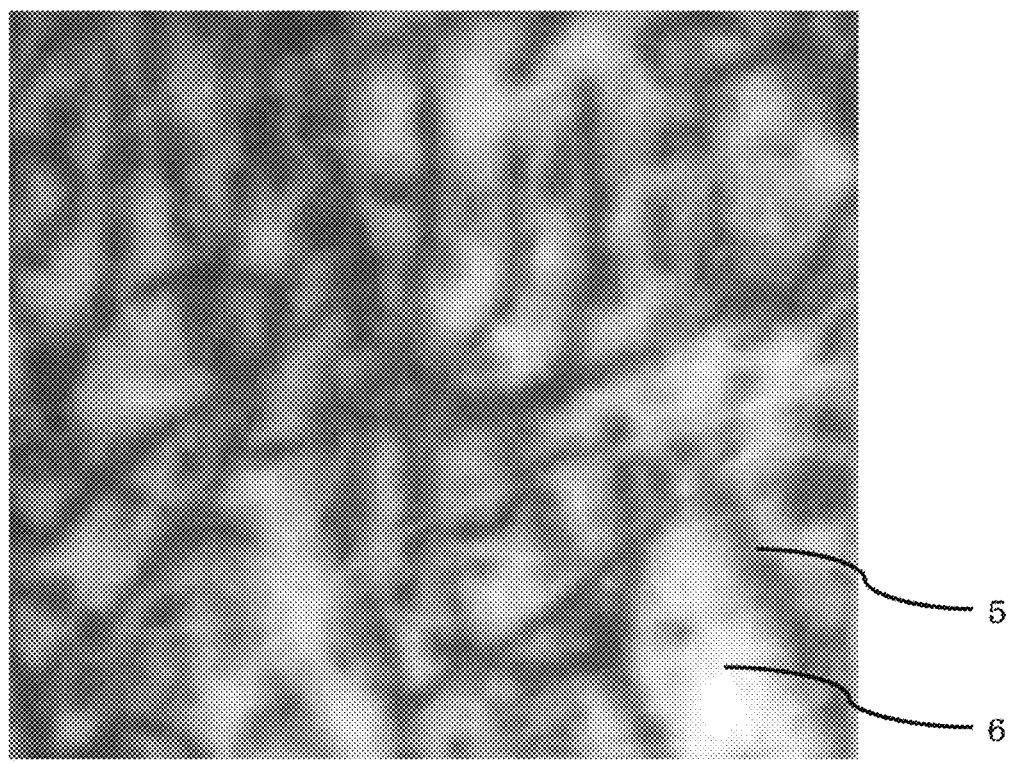
FIG. 9 is a microscope observation image of the surface of the separator produced according to Comparative example 3 after dyeing the separator with iodine.

Next, a separator was prepared, its air permeability (separator) was measured, and microscope observation after dyeing with iodine was performed (shown in FIG. 9) in the same manner as in Example 1 except that the above prepared porous sheet was used and drying in air was performed at normal temperature for 24 hours after immersion in the cellulose nanofiber aqueous dispersion. In FIG. 9, the linear part 5 dyed with the color of dark navy blue (dark color in Figure) is the binder fibers whose crystal structure was destroyed and partially melted by heating, and the part 6 which is not dyed is an area in which the binder component is virtually absent. It is found that a binder component, which was obtained by further melting and spreading the binder fibers and which braids the main fibers and the cellulose nanofibers, is rarely observed in FIG. 9, which is different from in FIG. 8.

Next, the static test in water and drying were performed, and the air permeability (after washing separator) was measured in the same manner as in Example 1 except that foe drying after the static test in water was performed at 40° C. by use of the air supply low-temperature dryer (manufactured by Yamato Scientific Co., Ltd.) for 2 hours.

In addition, in order to evaluate the drop out property in an alkaline aqueous solution, a different separator from the separator subjected to foe static test in water was immersed in an aqueous KOH solution having a concentration of 35% by mass for 24 hours, washed with running water for 30 minutes, and dried at 40° C. by use of the air supply low-temperature dryer (manufactured by Yamato Scientific Co., Ltd.) for 2 hours. The air permeability thereof [hereinafter, referred to as "air permeability (after immersion of separator in alkali)"] was measured.

The types aid amounts of the used main fibers and binder fibers, and the drying conditions are summarized in Table 1, and the evaluation results of the porous sheet and separator are summarized in Table 2.

TABLE 1

Types and amounts of main fibers and binder fibers, and drying conditions

| | | Example 1 | Example 2 | Example 3 | Example 4 | Comparative example 1 | Comparative example 2 | Comparative example 3 |
|---|---|---|---|---|---|---|---|---|
| Main Fiber | Polyvinyl alcohol | 1.6 g (80% by mass) | 0.8 g (40% by mass) | 0.9 g (45% by mass) | 0.8 g (40% by mass) | — | — | 0.9 g (45% by mass) |
| | PET | — | — | — | — | 1.6 g (80% by mass) | 0.9 g (45% by mass) | — |
| | Tencel | — | 0.9 g (45% by mass) | 0.8 g (40% by mass) | 0.9 g (45% by mass) | — | 0.8 g (40% by mass) | 0.8 g (40% by mass) |
| Binder Fiber | Polyvinyl alcohol | 0.4 g (20% by mass) | 0.3 g (15% by mass) | 0.3 g (15% by mass) | 0.3 g (15% by mass) | — | — | 0.3 g (15% by mass) |
| | PET | — | — | — | — | 0.4 g (20% by mass) | 0.3 g (15% by mass) | — |

TABLE 1-continued

Types and amounts of main fibers and binder fibers, and drying conditions

| | | Example 1 | Example 2 | Example 3 | Example 4 | Comparative example 1 | Comparative example 2 | Comparative example 3 |
|---|---|---|---|---|---|---|---|---|
| Concentration of cellulose nanofiber aqueous dispersion | (I) 3 to 4 nm | 0.33% by mass | 0.33% by mass | 0.33% by mass | — | 0.33% by mass | 0.33% by mass | 0.33% by mass |
| | (II) 200 nm | — | — | — | 5% by mass | — | — | — |
| Drying conditions after immersion in cellulose nanofiber aqueous dispersion | ROTARY DRYER | 110° C. 1 minute | 110° C. 1 minute | 90° C. 1 minute | 110° C. 1 minute | 110° C. 1 minute | — | — |
| | Hot air dryer | — | — | — | — | — | 90° C. 10 minute | — |
| | Drying in air | — | — | — | — | — | — | normal temperature 24 hours |
| Conditions of drying after static test in water | ROTARY DRYER | 120° C. 1 minute | — | — | — | 120° C. 1 minute | — | — |
| | Air supply low-temperature dryer | — | 40° C. 2 hours | 40° C. 2 hours | 40° C. 2 hours | — | 40° C. 2 hours | 40° C. 2 hours |

TABLE 2

Evaluation results of porous sheet and separator

| | Example 1 | Example 2 | Example 3 | Example 4 | Comparative example 1 | Comparative example 2 | Comparative example 3 |
|---|---|---|---|---|---|---|---|
| Thickness of porous sheet [μm] | 113 | 112 | 129 | 112 | 191 | 129 | 112 |
| Air permeability (porous sheet) [cc/cm²/second] | 33.3 | 2.72 | 4.22 | 2.72 | 104 | 19.0 | 2.72 |
| Air permeability (separator) [cc/cm²/second] | 11.4 | 0.963 | 1.20 | 0.772 | 89.6 | 15.9 | 0.94 |
| Air permeability decrease rate X [%] | 65.8 | 64.5 | 71.6 | 71.6 | 13.9 | 16.3 | 65.4 |
| Air permeability (after washing separator) [cc/cm²/second] | 14.9 | 1.05 | 1.32 | 1.15 | 105 | 17.3 | 1.31 |
| Air permeability decrease rate Y [%] | 55.3 | 61.4 | 68.7 | 57.8 | 0 | 8.95 | 51.8 |
| Air permeability (after alkali immersion of separator) [cc/cm²/second] | — | 1.01 | — | — | — | — | 1.63 |
| Air permeability decrease rate Z [%] | — | 62.9 | — | — | — | — | 40.1 |

"Air permeability decrease rate X" in Table 2 is a decrease rate of the air permeability when comparing the air permeability (porous sheet) to the air permeability (separator), that is, a decrease rate of the air permeability before and after combining the cellulose nanofibers with the porous sheet, and obtained by the following formula.

$$\text{Air permeability decrease rate } X = \left\{1 - \frac{\text{air permeability(separator)}}{\text{air permeability(porous sheet)}}\right\} \times 100 \quad \text{[Mathematical formula 1]}$$

Therefore, it is indicated that the higher the air permeability decrease rate X, the higher the combined amount of the cellulose nanofibers with the porous sheet.

"Air permeability decrease rate Y" in Table 2 is a decrease rate of the air permeability when comparing the air permeability (porous sheet) to the air permeability (after washing separator), and obtained by the following formula.

$$\text{Air permeability decrease rate } Y = \left\{1 - \frac{\text{air permeability (after washing separator)}}{\text{air permeability(porous sheet)}}\right\} \times 100 \quad \text{[Mathematical formula 2]}$$

Therefore, it is indicated that the higher the air permeability decrease rate Y, the higher the residual amount of the cellulose nanofibers after washing.

"Air permeability decrease rate Z" in Table 2 is a decrease rate of the air permeability when comparing the air permeability (porous sheet) to the air permeability (after immersion of separator in alkali), and obtained by the following formula $$\text{Air permeability decrease rate } Z = \left\{1 - \frac{\text{air permeability (after immersion of separator in alkali)}}{\text{air permeability(porous sheet)}}\right\} \times 100 \quad \text{[Mathematical formula 3]}$$

Therefore, it is indicated that the higher the air permeability decrease rate Z, the higher the residual amount of the cellulose nanofibers after alkali immersion.

As shown in Table 2, the separators of Examples 1 to 4 had the high air permeability decrease rate X. From this, it is found that a large amount of the cellulose nanofibers combined at the inside and on the surface of the porous sheet by fusion of the binder component. In addition, the separators of Examples 1 to 4 had the high air permeability decrease rate Y. From this, it is found that a large amount of the cellulose nanofibers remained after washing. The air permeability decrease rate Z of Example 2 was higher than that of Comparative example 3. It indicates that the residual of the cellulose nanofibers in the electrolytic solution of Example 2 was higher than that of Comparative example 3. It can be considered that this is because, as the main fiber and the binder fiber, the polyvinyl alcohol fibers having high compatibility with each other and high compatibility with cellulose nanofibers are used and the cellulose nanofibers could be strongly combined with the porous sheet by fusion of the binder component. This matter are shown in FIGS. 2,5,6 and 8.

Thus, it is demonstrated that the separator of the present invention has a combination of the preferable air permeability enabling high prevention of internal short circuit and the high retention rate of such an air permeability in the electrolytic solution, and has more improved uniformity of the air permeability.

In contrast, the separators of Comparative examples 1 and 2 had the low air permeability decrease rate X. From this, it is found that the cellulose nanofibers less adhered to or combined with the porous sheet. In addition, the separator of Comparative example 1 has zero of the air permeability decrease rate Y. It is found that all cellulose nanofibers adhered to or combined with the porous sheet was dropped out by washing. The separator of Comparative example 2 had the remarkably low air permeability decrease rate Y. From this, it is found that almost all cellulose nanofibers adhered to or combined with the porous sheet was dropped out by washing. It can be considered that this is because the PET fibers having poor compatibility with the cellulose nanofibers were used as the main fiber and the binder fiber.

In the separator of Comparative example 3, as the main fiber and the binder fiber, the polyvinyl alcohol fibers having high compatibility with the cellulose nanofibers were used. However, since only the drying in air was performed after immersion in the cellulose nanofiber aqueous dispersion in Comparative example 3, the binder component was not remelted as is clear from FIG. 9, the cellulose nanofibers could not be combined by fusion of the binder component. As a result, the air permeability decrease rate after water-washing Y and the air permeability decrease rate after alkali-immersion Z of Comparative example 3 were lower than those of the Examples.

INDUSTRIAL APPLICABILITY

The separator of the present invention has a combination of the preferable air permeability enabling high prevention of internal short circuit and the high retention rate of such an air permeability in the electrolytic solution, and has more improved uniformity of the air permeability. Therefore, the separator of the present invention can be preferably used as a separator of a battery, especially a separator of an alkaline manganese dry battery, or a separator for a capacitor.

The invention claimed is:

1. A separator comprising a porous sheet and cellulose nanofibers,
   wherein the porous sheet comprises:
   a main fiber, and
   a binder component having an SP value of 11 to 16 $(cal/cm^3)^{1/2}$, wherein the binder component is a fibrous binder,
   wherein the porous sheet has the cellulose nanofibers at the inside and on the surface thereof, and
   wherein the cellulose nanofibers are combined with the porous sheet by fusion of the binder component such that the binder component at least partially loses its shape.

2. The separator according to claim 1, wherein the porous sheet comprises a vinyl acetate-based resin fiber as the main fiber.

3. The separator according to claim 2, wherein the porous sheet comprises a polyvinyl alcohol fiber as the main fiber.

4. The separator according to claim 1, wherein the binder component is based on a vinyl acetate-based resin fiber.

5. The separator according to claim 4, wherein the binder component is based on a polyvinyl alcohol fiber.

6. The separator according to claim 1, wherein a number average fiber diameter of the cellulose nanofibers is 2 to 300 nm.

7. The separator according to claim 1, wherein a thickness of the porous sheet is 30 to 250 µm.

8. The separator according to claim 1, wherein the porous sheet comprises mercerized pulp and/or a lyocell fiber as the main fiber.

9. The separator according to claim 1, wherein a decrease rate of an air permeability of the separator after stationarily leaving the separator in water for 30 minutes with respect to an air permeability of the porous sheet is 50% or more.

10. An alkaline manganese dry battery, comprising the separator according to claim 1.

11. A capacitor, comprising the separator according to claim 1.

12. The separator according to claim 1, wherein the main fiber and the binder component are different from each other.

13. The separator according to claim 3, wherein the polyvinyl alcohol fiber as the main fiber has a dissolution temperature in water of 90° C. or more.

14. The separator according to claim 5, wherein the polyvinyl alcohol fiber as the binder component has a dissolution temperature in water of 40 to 90° C.

* * * * *